United States Patent [19]

Okamura

[11] Patent Number: 4,724,950
[45] Date of Patent: Feb. 16, 1988

[54] CONVEYOR ROLLER WITH SURFACE LAYER COMPOSED OF MATRIX RUBBER AND DISPERSED COLLAGEN FIBERS

[75] Inventor: Hiroshi Okamura, Kashiwa, Japan

[73] Assignee: Hisao Sato, Saitama, Japan

[21] Appl. No.: 838,757

[22] Filed: Mar. 12, 1986

[30] Foreign Application Priority Data

Mar. 12, 1985 [JP] Japan .................................. 60-47402

[51] Int. Cl.$^4$ ............................................. B65G 13/02
[52] U.S. Cl. ................................................... 198/780
[58] Field of Search .................. 198/780, 699.1, 688.1; 29/132

[56] References Cited

U.S. PATENT DOCUMENTS

| | | | |
|---|---|---|---|
| 270,432 | 1/1883 | Hill | 29/132 |
| 2,119,491 | 5/1938 | Rapport | 29/132 |
| 2,326,777 | 8/1943 | Guth | 29/132 |
| 2,450,410 | 10/1948 | Baymiller | 29/132 |
| 2,811,752 | 11/1957 | Garrett | 29/132 |
| 2,843,883 | 7/1958 | Rockoff | 29/132 |
| 3,617,445 | 11/1971 | Brafford | 29/132 |
| 4,492,012 | 1/1985 | Pala et al. | 29/132 |

FOREIGN PATENT DOCUMENTS

| | | | |
|---|---|---|---|
| 513684 | 6/1955 | Canada | 29/132 |
| 55-144041 | 11/1980 | Japan . | |
| 55-51041 | 12/1980 | Japan . | |
| 3686 | of 1898 | United Kingdom | 29/132 |
| 26507 | of 1910 | United Kingdom | 29/132 |
| 621556 | 4/1949 | United Kingdom | 29/132 |

OTHER PUBLICATIONS

Chemical Abstract, vol. 94, No. 18, Entry No. 141013j.
Chemical Abstract, vol. 94, No. 24, Entry No. 193725n.

Primary Examiner—Robert J. Spar
Assistant Examiner—D. Glenn Dayoan
Attorney, Agent, or Firm—Bruce L. Adams; Van C. Wilks

[57] ABSTRACT

This invention concerns a transfer roller prepared by blending short collagen fibers in a rubber matrix for conveying plate-like materials sandwiched between paired rollers. By mixing collagen fibers mechanically in the rubber matrix with no addition of process oil or oil type reinforcing agent, conveyor rollers of a long operation life which show no reduction in the conveying function even when water or oil droplets are deposited to the rollers surface is obtained.

25 Claims, 1 Drawing Figure

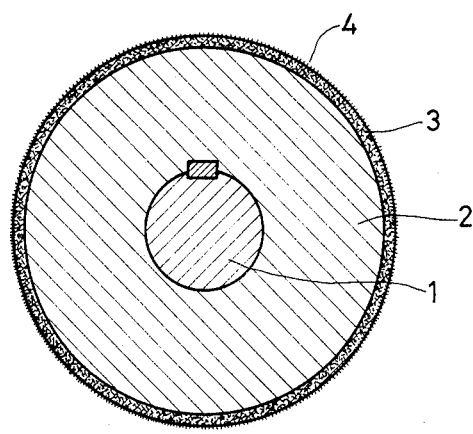

CONVEYOR ROLLER WITH SURFACE LAYER COMPOSED OF MATRIX RUBBER AND DISPERSED COLLAGEN FIBERS

BACKGROUND OF THE INVENTION

This invention concerns a roller for conveying articles in contact therewith.

Heretofor, rubber rollers have generally been used for the conveyor rollers of this type.

Since the conventional conveyor rollers or the like are in direct contact with articles to be conveyed, they have been manufactured mainly with an aim of increasing the mechanical strength and the friction coefficient.

However, these conventional rollers have a drawback that they are damaged in a relatively short period of time during use and become incapable of obtaining smooth and stable conveyance.

For instance, if they are used for conveying plate-like articles such as extended copper coils, a pair of upper and lower rollers are deformed due to the damages caused by lateral edges of plates such that the respective rollers are convexed from the sides toward the lateral center. As a result, the articles to be conveyed run in a zig-zag manner, which further increases the extent of damages at the surface and prevents the rollers from the rotation in a short time.

Further, since the conventional conveyor rollers are sensitive to contaminations, it is difficult to maintain the physical properties of the surface of the rollers at the initial state for a long period of time and, in addition, the friction coefficient of the surface of the roller greatly varies depending on the dry or wet state or deposition of oil droplets.

Accordingly, the friction coefficient fluctuates greatly even in an identical roll depending on the stance of use, whereby such a fluctuation changes the transmission force for driving roller and also the circumferential or rotational speed of a driven roller to inevitably cause variations in the feeding speed and running in a zig-zag way.

The foregoing situations causes a fetal defect of a lengthy roller conveyor or the like.

By the way, it has been known that a composite material prepared by pressure-molding basic rubber material containing fine collagen fibers exhibits a great dynamic friction coefficient in a dry state (refer to Japanese Patent Laid-Open No. 144041/1980). However, such a composite material is intended to increase the dynamic frictional force in an identical state and a relatively great amount of various additives (reinforcing agent and processing aid) are blended for improving the dispersionability and the moldability of the rollagen fibers and for compensating the reduction in the mechanical strength of the molded material caused by the blending of the fibers.

Although the conveyor roller molded from the abovementioned composite material exhibits a predetermined performance under the circumstance of dry condition, the frictional coefficient of the surface is remarkably decreased to spoil the function as the conveyor roller in such a circumstance as oil droplets exist on the surface of the roller.

The present inventors have studied the reason for the foregoing undesired phenomenons and found that process oils used for improving the dispersionability of the fibers cause the elimination of cell structures of the blended fibers. Further, it has been also found that the fluctuation in the frictional coefficient of the surface becomes smaller as the amount of the reinforcing agent such as carbon black and hydrous or anhydrous silicic acid (white carbon), etc. for improving the general physical properties of the rollers is reduced.

SUMMARY OF THE INVENTION

This invention has been accomplished based on the discovery and the knowledge as described above and the invention provides a stably running conveyor roller in which the friction coefficient of the surface shows no substantial change either under the dry or wet condition or in a case of oil deposition.

The conveyor roller according to this invention comprises a composite material as a roller surface layer formed by kneading and dispersing short fibers having plasticity and cell structure such as collagen fibers into matrix natural or synthetic rubber while restricting, as much as possible, the addition of oil type mixing aids and additives or reinforcing agents which tend be adsorbed or absorbed in the cell texture of the fibers. More specifically, a sheet, which is prepared by mechanically mixing 10 to 100 parts of short fibers (fiber length of about 0.5 mm-5.0 mm) cut out from fine chromium-treated collagen fibers obtained by the treatment as disclosed, for example, in Japanese Patent Publication No. 51041/1980 with 100 parts of natural or synthetic rubber, is wound and formed on the surface layer of a roller core material at a thickness of at least about 3 mm, such that the incorporated and dispersed short fibers project preferably at least by 0.2 mm from the surface of the basic rubber material.

The roller according to this invention undergoes stable running operation even if the circumferential or rotational speed is increased more than twice as compared with the conventional roller with respect to an identical article to be conveyed and, in addition, it has a working life from 2 to 3 times longer than that of the conventional roller since the surface of the roller is less sensitive to the damages irrespective of the relatively low mechanical strength thereof.

The reason why the above-described advantages or effects can be obtained has not yet been clear at present, it may be attributable to the function of the microstructure of the fibers protruding from the surface.

BRIEF DESCRIPTION OF THE DRAWING

The sole FIGURE is a cross-sectional view of a roller according to the present invention.

DESCRIPTION OF THE PREFERRED EMBODIMENT

This invention will now be explained more in detail referring to a working example and in conjunction with the drawing comparative example.

EXAMPLE 50 parts of collagen fibers obtained by opening animal hide and subjected to chromium treatment for providing heat resistivity and cut into a length from 1.0 to 1.5 mm and one part of a dispersing agent (stearic acid) were mixed with 100 parts by weight of chloroprene rubber. The mixture was charged into a kneader heated to a high temperature of 130° C. and, thereafter, taken out rapidly and cooled to room temperature.

Then, the mixture was kneaded together with 5 parts of zinc powder, 4 parts of magnesium oxide and one part of vulcanization promoter in an open mill to mold the same into a sheet of 3 mm thickness.

After applying sand blast treatment and coating a vulcanizing adhesive to the surface of a roller substrate or cylindrical body 2 disposed around a shaft 1 160 mm in diameter and 600 mm in the surface length, the sheet prepared as described above was wound therearound to constitute a roller surface layer 3 having a diameter of 220 mm, which was then tightened by winding a cotton cloth and then heat-cured at a temperature of about 150° C. (under 4 atm pressure) in a steam oven for three hours. The molded roller was subjected to grinding till the outer diameter was reduced to 200 mm to raise projections 4 of the collagen fibers from the roller surface layer 3. As a comparative example, a roller of an identical size was manufactured under the same conditions except for mixing 50 parts of nylon fibers instead of the collagen fibers.

They had physical properties as shown in the table.

|  | Example | Comparative Example |
| --- | --- | --- |
| Hardness (Hs) | 75° | 80° |
| Tensile strength (kg/cm²) | 48 | 115 |
| Elongation (%) | 320 | 400 |
| Tear strength (kg/cm) | 18 | 41 |
| Abrasion degree (cc/R) × 1000 | 0.41 | 0.225 |
| Friction coefficient |  |  |
| (dry) | 0.45 | 0.12 |
| (wet) | 0.36 | 0.04 |
| (oil) | 0.30 | 0.01 |

It can be seen from the foregoing results that although the roller incorporated with nylon fibers has a large mechanical strength, it has only a low friction coefficient of the surface, which is further decreased remarkably by the deposition of oil droplets, and the roller does not function as a conveying roller at all. Furthermore, it is also apparent that the collagen fibers do not function as the reinforcing agent.

Each of the rollers as described above was used as a stretching conveyor roller for stainless steel coils (1.2 mm thickness, 500 mm width) and the result is as follows.

| Stretching of the stainless steel coils | | |
| --- | --- | --- |
|  | Example | Comparative Example |
| One month after | no change | surface deformed, remarkable slip (not usable) |
| Two months after | no change | — |
| Three months after | slight surface abrasion | — |

Since substantially the same results for the performance as described above can also be obtained even if the articles to be conveyed are replaced, for example, with copper coils, it is considered that the roller according to this invention can provide similar effects to various articles to be conveyed.

REFERENCE EXAMPLE

The friction coefficient of the surface of a roller in which a oil-type mixing additive in the form of a process oil is added during mixing and blending in a kneader the mixture of the same composition as in Example was shown below and it is confirmed that there is an apparent correlation between the addition of the process oil and the friction coefficient.

|  | 10 parts | 5 parts | 3 parts |
| --- | --- | --- | --- |
| Dry | 0.45 | 0.44 | 0.45 |
| Wet | 0.08 | 0.20 | 0.22 |
| Oil | 0.08 | 0.03 | 0.05 |

Namely, although the roller incorporated with the process oil exhibits the friction coefficient similar to that of the roller according to this invention under the dry state, the friction coefficient thereof is rapidly decreased to reduce the stretching force by mere deposition of water droplets, whereby the conveying function becomes instable.

Test Method

The sliding friction coefficient ($\mu$) was measured by using a KN type tester by winding a stainless steel belt (0.6 mm thickness, 50 mm width) around a roller (150 mm diameter × 60 mm length at a winding contact angle of $\pi/2$ and applying the load of a weight of 2.5 kg to the lower end of the belt. The value was calculated under the following equation $$\mu = 2/\pi \ln T/W$$

where
T: indicates the reading on a spring balancer (kg).
w: indicates the weight of a load.
$\mu$: indicates the sliding friction coefficient.

The abrasion test was also carried out by the KN type abrasion tester.

As described above, in the roller according to this invention, while it is necessary to optimally select the kneading conditions for the collagen fibers since no process oil is used at all, the collagen fibers can be incorporated up to 100 parts into 100 parts of the starting matrix of rubber. On the other hand, there is no substantial difference in the friction coefficient between the dry state and oil-deposited or oily state as compared with the conventional oil containing no collagen fibers, if the addition amount is less than 10 parts.

What is claimed is:

1. A conveyor roller comprising: a shaft; a cylindrical body disposed around the shaft; and a roller surface layer disposed on the circumferential surface of the cylindrical body and composed of 10 to 100 parts of short collagen fibers treated with chromium and 100 parts of a rubber matrix, the roller surface layer being free of oil type mixing agents and additives, and a portion of the short fibers projecting from the outer surface of the said roller surface layer.

2. The conveyor roller as defined in claim 1; wherein the rubber matrix comprises natural rubber.

3. The conveyor roll as defined in claim 1; wherein the rubber matrix comprises synthetic rubber.

4. The conveyor roller as defined in claim 1; wherein the collagen fibers project from the outer surface of the roller surface layer at least by 0.2 mm.

5. The conveyor roller as defined in claim 2; wherein the collagen fibers project from the outer surface of the roller surface layer at least by 0.2 mm.

6. A roller comprising: a shaft; a cylindrical body disposed around the shaft; and a surface layer disposed on the circumferential surface of the cylindrical body, the surface layer consisting essentially of 100 parts of a rubber matrix and 10 to 100 parts of chromium-treated collagen fibers disposed in the rubber matrix and being free of any oil-type mixing additives, the collagen fibers projecting outwardly from the surface layer to effectively increase the friction coefficient of the surface layer.

7. A roller as defined in claim 6; wherein the chromium-treated collagen fibers have a length of 0.5 mm to 5.0 mm.

8. A roller as defined in claim 7; wherein the chromium-treated collagen fibers have a length of 1.0 mm to 1.5 mm.

9. A roller as defined in claim 6; wherein the collagen fibers project from the surface layer at a distance not less than 0.2 mm.

10. A roller as defined in claim 6; wherein the surface layer has a friction coefficient more than three times that of a surface layer composed of a rubber matrix and nylon fibers projecting from the rubber matrix.

11. A material composition of a roller surface layer consisting essentially of: 100 parts of rubber matrix; and 10 to 100 parts of chromium-treated collagen fibers disposed in the rubber matrix and projecting from the roller surface layer, the material composition being free of any oil-type mixing additives so as to increase the friction coefficient of the roller surface layer under wet and oil surface conditions.

12. A material composition as defined in claim 11; wherein the rubber matrix comprises natural rubber.

13. A material composition as defined in claim 11; wherein the rubber matrix comprises synthetic rubber.

14. A material composition as defined in claim 13; wherein the synthetic rubber comprises chloroprene rubber.

15. A material composition as defined in claim 11; wherein the chromium-treated collagen fibers have a length of 0.5 mm to 5.0 mm.

16. A material composition as defined in claim 15, wherein the chromium-treated collagen fibers have a length of 1.0 mm to 1.5 mm.

17. A material composition as defined in claim 11; wherein the chromium-treated collagen fibers project from the roller surface layer a distance not less than 0.2 mm.

18. A material composition as defined in claim 11; wherein the roller surface layer has a friction coefficient more than one and a half times that of a roller surface layer containing oil-type mixing additives under wet surface conditions.

19. A material composition as defined in claim 11; wherein the roller surface layer has a friction coefficient more than three times that of a roller surface layer containing oil-type mixing additives under oily surface conditions.

20. A material composition as defined in claim 11; including a reinforcing agent.

21. A material composition as defined in claim 20; wherein the reinforcing agent comprises carbon black.

22. A material composition as defined in claim 20; wherein the reinforcing agent comprises white carbon.

23. A material composition as defined in claim 11; including a dispersing agent.

24. A material composition as defined in claim 23; wherein the dispersing agent comprises stearic acid.

25. A material composition as defined in claim 11; including a volcanization promoter.

* * * * *